(12) United States Patent
Vera et al.

(10) Patent No.: US 7,689,804 B2
(45) Date of Patent: Mar. 30, 2010

(54) SELECTIVELY PROTECTING A REGISTER FILE

(75) Inventors: Xavier Vera, Barcelona (ES); Jaume Abella, Barcelona (ES); Jose-Alejandro Pineiro, Barcelona (ES); Antonio Gonzalez, Barcelona (ES); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 11/642,337

(22) Filed: Dec. 20, 2006

(65) Prior Publication Data

US 2008/0155375 A1      Jun. 26, 2008

(51) Int. Cl.
    *G06F 12/10*    (2006.01)
(52) U.S. Cl. ........................................ 711/206
(58) Field of Classification Search ............... None
    See application file for complete search history.

(56) References Cited

U.S. PATENT DOCUMENTS

| | | | | |
|---|---|---|---|---|
| 6,314,511 B2* | 11/2001 | Levy et al. | ............ | 712/217 |
| 6,889,317 B2* | 5/2005 | Sami et al. | ............ | 712/218 |
| 7,058,877 B2* | 6/2006 | Tremblay et al. | ............ | 714/792 |
| 2004/0153763 A1* | 8/2004 | Grochowski et al. | ............ | 714/17 |
| 2008/0244186 A1* | 10/2008 | Bose et al. | ............ | 711/135 |

OTHER PUBLICATIONS

Lozano et al (Exploiting Short-Lived Variables in Superscalar Processors, pp. 292-302, MICRO-28, Proceedings of 28th Annual IEEE/AMC International Symposium on Microarchitecture, 1955).*
Glenn Hinton, et al., "The Microarchitecture of the Pentium 4 Processor," 2001, pp. 1-13.
Eric S. Fetzer, et al., "The Parity Protected, Multithreaded Register Files On The 90-nm Itanium Microprocessor," Jan. 2006, pp. 246-254.
L. Spainhower and T.A. Gregg, "IBM S/390 Parallel Enterprise Server G5 Fault Tolerance: A Historical Perspective," Sep./Nov. 1999, pp. 863-873.
Dmitry Ponomarev, et al., "Isolating Short-Lived Operands For Energy Reduction," Jan. 19, 2004, pp. 697-709.

* cited by examiner

*Primary Examiner*—Tuan V Thai
*Assistant Examiner*—Duc T Doan
(74) *Attorney, Agent, or Firm*—Trop, Pruner & Hu, P.C.

(57) ABSTRACT

In one embodiment, the present invention includes a method for protecting a value to be stored in a register of a register file with a first level of protection if the value is predicted to be used for a first time period, and protecting the value with a second level of protection if the value is predicted to be used for a second time period. Other embodiments are described and claimed.

22 Claims, 5 Drawing Sheets

SELECTIVELY PROTECTING A REGISTER FILE

BACKGROUND

Transient errors, often referred to as soft errors, are an increasing source of errors in processors. Because of the decreased size of devices and reduced voltages at which they operate, these devices are more vulnerable to cosmic particle strikes and parameter variations. Such events can lead to transient errors that occur randomly and can affect proper execution of a processor. With each generation of semiconductor manufacturing technology, susceptibility to soft errors is expected to increase.

Certain mechanisms have been used to attempt to correct soft errors. Typically, these measures include providing redundant paths for redundant operations on data. However, such redundant paths can significantly increase the size and power consumption of a processor, leading to performance degradation. Furthermore, some approaches use simultaneous multithreading (SMT) to detect errors. In such approaches, a process is scheduled on two separate execution paths (e.g., two threads in a SMT core). The resulting data are then compared for identity. If the results differ, this is an indication of a soft error, and the error is detected. However, performance degradation is significant, since some hardware is devoted to error detection instead of running other processes and complexities exist in supporting result comparison and thread coordination.

While some processor designs have focused on protecting the datapath, caches, and main memories, register files (RFs) have been largely neglected. RFs are accessed very frequently (and thus the probability of errors that propagate to the output of a program may increase). While adding parity to stored values may enable error detection, correction is only possible if the instruction producing the corrupted value has not left the pipeline. On the other hand, error correction coding (ECC) may enable error detection and correction, but only at a high cost in terms of area and power. Over-estimation of soft errors can result in over-design of protection mechanisms, which will eventually increase the reliability cost. On the other hand, insufficient protection against soft errors may cause a system to be unreliable.

DETAILED DESCRIPTION

In various embodiments, cost-effective mechanisms may be used to increase the resistance of register files (RFs) or other storages to particle strikes. Such mechanisms may impart selective use of error correction coding (ECC) based on usage of the information in a register. That is, an error detection mechanism such as parity may be sufficient to guarantee error detection and correction for values that are consumed before a producer commits, since if an error is detected in a register, flushing of the pipeline and re-execution of instructions starting from the head of a reorder buffer (ROB) may correct that error. Only for those cases when a register is read after the producer commits is an ECC mechanism used, since re-execution of an instruction that has left the pipeline is not possible.

Figure 1:
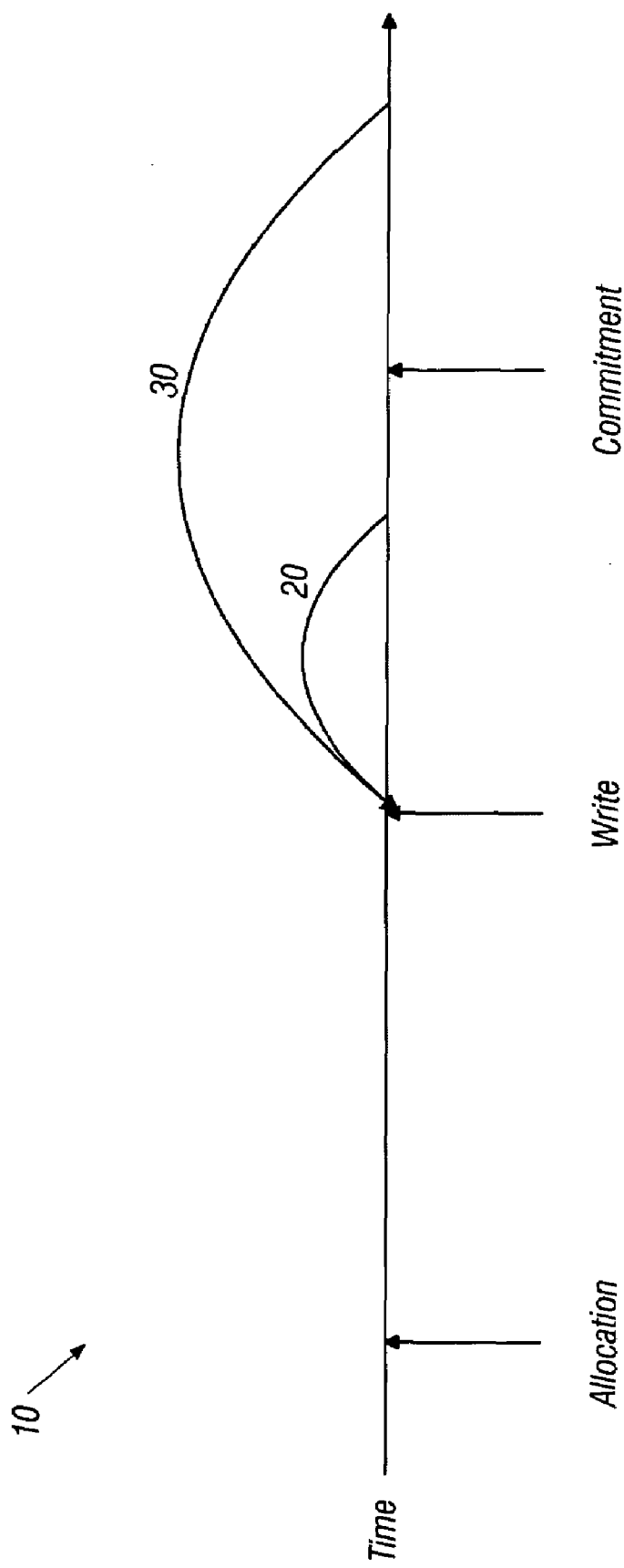
FIG. 1 is a timing diagram of various stages of instruction execution in accordance with an embodiment of the present invention.

To illustrate the lifetime of a register and its use in various stages of instruction execution, reference is made to FIG. 1. FIG. 1 shows a timing diagram of various stages of instruction execution. Specifically, timing diagram 10 shows that a register may be allocated for an instruction at an allocation time. The instruction may then be executed and after execution of the instruction, its result may be written to the allocated register, i.e., at write time. Later, e.g., after various checks are made, and instructions earlier than the instruction in program order have retired, the instruction may be committed to the architectural state of the processor and accordingly the value present in the register may be committed at commitment time.

Because a producer instruction that produces a result can have consumer instructions that use the result produced, the register contents may be vulnerable to soft errors for varying amounts of time based on when one or more consumer instructions seek to use the value stored in the register. As shown in FIG. 1, a first vulnerability window 20 which may correspond to a relatively short-lived operand, i.e., a result having a relatively short useful life may occur when a last consumer that uses the stored result accesses the stored result prior to instruction commitment. Note that because the producer instruction remains available, e.g., in the ROB for re-execution should a soft error occur, minimal protection for the register contents may be provided.

In contrast, a relatively long-lived register value, i.e., a value having a long useful life, may occur in time interval 30. That is, in time interval 30, a last consumer instruction does not access the contents of the register until after commitment time of the producer of the register's contents. As a result, the producer instruction has already exited the ROB and cannot be re-executed. Accordingly, more rigorous protection may be provided for such situations. While the scope of the present invention is not limited in this regard, in some embodiments a relatively lower or first level of protection may correspond to parity coding for a register's contents. Such parity encoding may enable detection of an error but not its correction. In contrast, for situations in which a relatively long instruction lifetime is predicted, a higher or second level of protection may correspond to an error correction mechanism such as ECC, a forward error correction (FEC) mechanism or another such error correction mechanism. Such mechanisms may thus enable both detection and correction of single bit errors and may even enable detection of more than a single bit error.

In some implementations, a small number of ECC generators/checkers (e.g., less than one per register port) may be present, and only the most vulnerable registers may be protected with ECC. In some embodiments, only 2 ECC generators may be present, which may be able to detect and recover the vast majority of single bit upsets. The remaining registers may instead make use of parity. As described above, the lifetime of a register lasts from register allocation to deallocation. However, a given register is vulnerable only from the time it is written until the last read of the stored value. As used herein, this time may be referred to as the useful or usage time. Because many of the values produced in a datapath are consumed before the producer commits, ECC is not needed for those registers. Moreover, many of the registers (i.e., temporal registers) are used only within a macro-operation, and thus may be guaranteed to be safe with parity because they cannot be read again after commitment. In one embodiment, to reduce costs, the register destination of only those instructions that: (i) have not been renamed; or (ii) are at the head of the ROB may be protected with ECC at writeback time.

Various manners of determining at what level to encode a register's value may be implemented in different embodiments. However, in many embodiments the determination may be based on a prediction as to whether a register's contents are likely to have a limited useful time or a relatively longer useful time. While the scope of the present invention is not limited in this regard, in some embodiments a useful time may based on, for example, a last read and/or ROB position.

Figure 2:
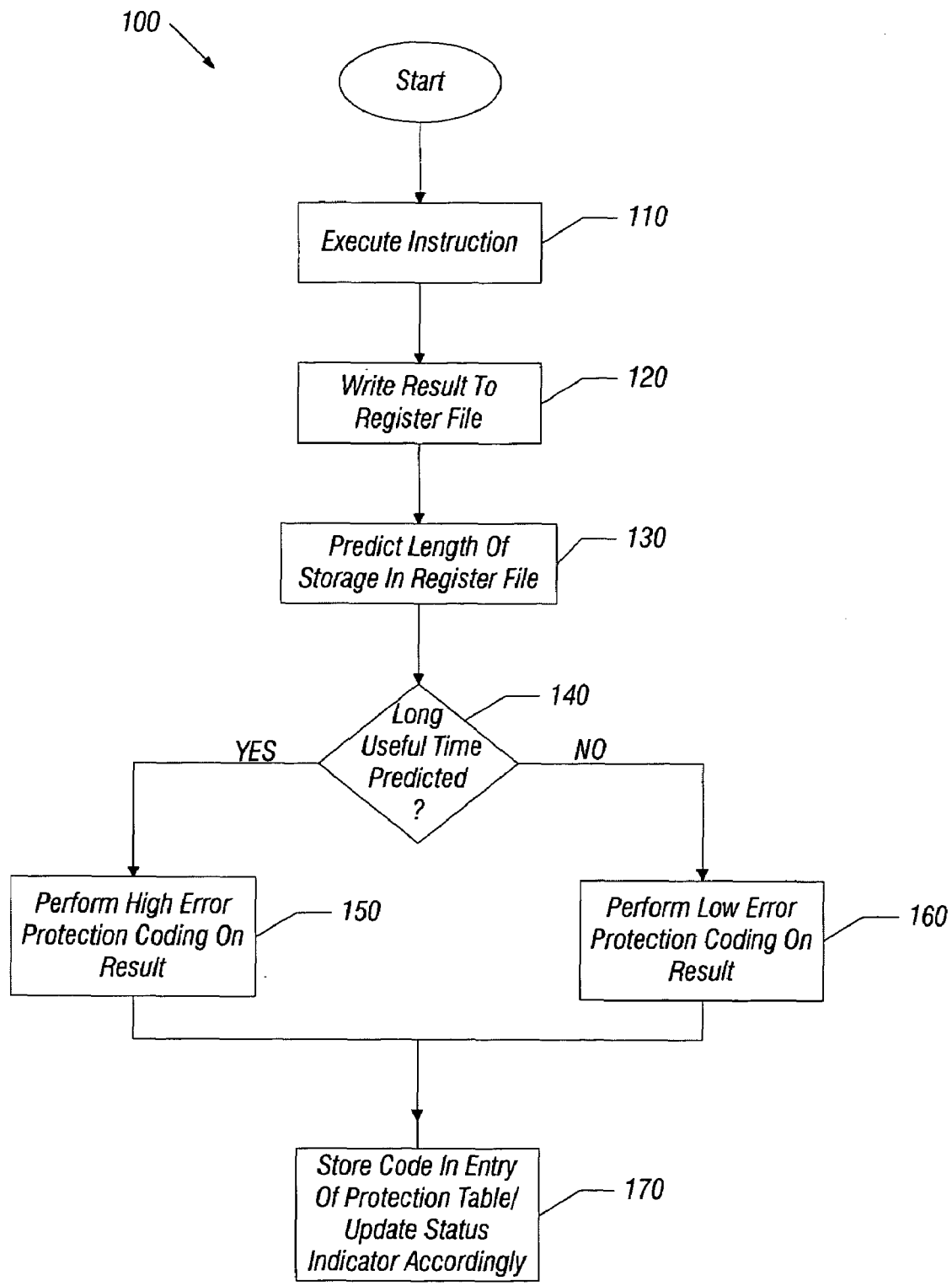
FIG. 2 is a flow diagram of a method for protecting a register file or other storage in accordance with an embodiment of the present invention.

Referring now to FIG. 2, shown is a flow diagram of a method for protecting a register in accordance with an embodiment of the present invention. As shown in FIG. 2, method 100 may begin by executing an instruction (block 110). For example, this instruction may correspond to a producer instruction that generates a result to be stored in a selected register of a register file or other destination storage. This producer instruction may have one or more instructions that are dependent thereon (i.e., consuming instructions) that will later read the stored result.

After execution of the instruction in a selected execution unit which may be an integer execution unit, floating point execution unit or other type of execution unit, the result may be written to a register file (block 120). To do so, a destination register within the register file may be identified. For example, the instruction may specify that its result is to be written to a first architectural register, AX. Because of the limited number of architectural registers present in a given processor, a register file may include many more physical registers such that multiple independent versions of the architectural registers can be present in the different physical registers of the register file. Accordingly, a renamer or other such control mechanism may reassign or rename this destination register AX to a physical register of the register file, e.g., a first register R1. Note that the execution of an instruction (block 110) may be performed at execute time, while writing of the result to the register file (block 120) may occur at write back.

In parallel with this write back, a prediction may be made as to the length of time that the result is to be stored in this physical register of the register file (block 130). As will be described further below, various parameters may be analyzed to determine a predicted lifetime of the value in the register. At diamond 140, it may be determined whether a long useful time has been predicted. If such a long useful time is predicted, control passes to block 150. At block 150, a high error protection coding may be performed on the result. For example, this high error correction protection coding may correspond to an ECC.

Referring still to FIG. 2, control passes from block 150 to block 170, where the code may be stored in an entry of a protection table. Specifically, the error correction code that is generated for the given register of the register file may be stored in an entry of a separate protection table, where the entry corresponds to the given register. Furthermore, an indicator may be updated to indicate that the entry includes an error protection code of a high level, i.e., an error correction code (also block 170).

If instead at diamond 140 it is determined that the register value is not predicted to be long lived, control passes to block 160. At block 160, low error protection coding may be performed on the result that is stored in the register. For example, simple error detection coding, such as parity coding may be implemented. The resulting error detection code may then be stored in the corresponding entry of the protection table and the status indicator updated accordingly (i.e., indicative of the error detection coding) (also block 170). While shown with this particular implementation in the embodiment of FIG. 2, the scope of the present invention is not so limited in this regard.

Figure 3:
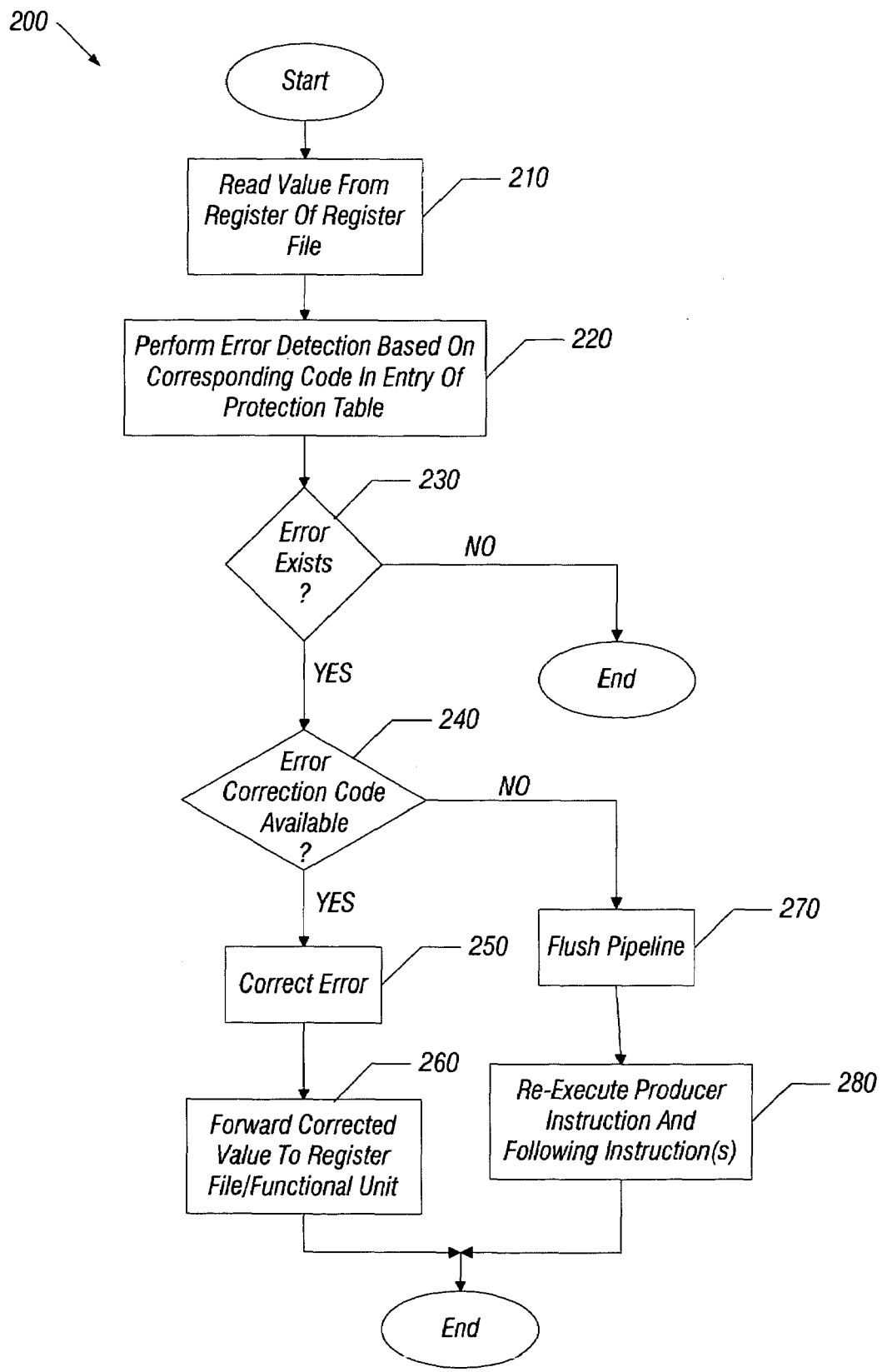
FIG. 3 is a flow diagram of a method for using error protection in accessing a register's contents in accordance with an embodiment of the present invention.

Accordingly, protection for soft errors may be provided for values stored in registers of a register file. To take advantage of this protection, when the corresponding value is read from the register file, the coding may be accessed and decoded to detect whether an error has occurred and initiate appropriate action to resolve the error. Referring now to FIG. 3, shown is a flow diagram of a method for using error protection in accessing a register's contents in accordance with an embodiment of the present invention. As shown in FIG. 3, method 200 may begin by reading a value from a register of a register file (block 210). For example, a consumer instruction that is to read an operand may access the register and use the value present to perform an operation. In parallel with the accessing of the register file, error detection may be performed based on the code in the corresponding entry of the protection table (block 220). As described above, this coding may be an error correction code or an error detection code. In either event, at first it may be determined whether an error exists (diamond 230), based on decoding the code, e.g., in a checker or other such logic. If not, method 200 may conclude and the results obtained from the register may be used in continued normal operation of the processor. If instead at diamond 230 it is determined that an error exists, control passes to diamond 240, where it may be determined whether an error correction code is available. If so, the error may be corrected (block 250). That is, the code may be used to correct the error to thus obtain the value that was originally stored in the register. This corrected value may be forwarded, e.g., both to the register file for storage in the appropriate register, as well as optionally to a functional unit to which the register contents were provided (block 260). Other actions may be taken in parallel with these actions such as flushing the pipeline and restarting execution.

If instead at diamond 240 an error correction code is not available, i.e., only an error detection code is present, control passes to block 270. At block 270, the pipeline may be flushed to remove the offending value and any calculations performed on it from the pipeline. Then, re-execution of the producer instruction and any instructions following the producer may be performed (block 280). For example, all instructions present in a reorder buffer from the head on down may be re-executed. In this way, architecturally correct execution may be obtained. While shown with this particular implementation in the embodiment of FIG. 3, the scope of the present invention is not limited in this regard.

Figure 4:
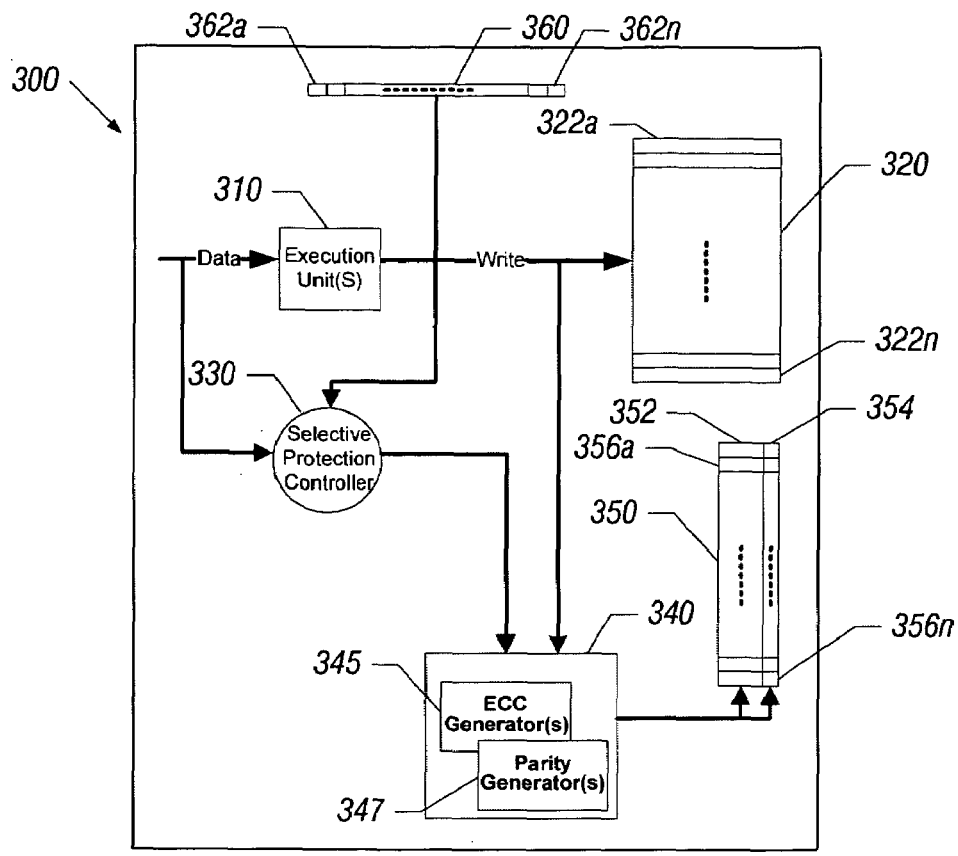
FIG. 4 is a block diagram of a portion of a processor in accordance with an embodiment of the present invention.

In various embodiments, different processor architectures may take advantage of selective register protection to improve performance at a reduced cost and size. Referring now to FIG. 4, shown is a block diagram of a portion of a processor in accordance with an embodiment of the present invention. As shown in FIG. 4, processor 300 may include one or more execution units 310 that may be used to perform operations on data responsive to instructions. After execution in an execution unit 310, a result may be written, e.g., to a register file 320 that includes a plurality of registers 322a-322n (generically register 322). To enable selective register protection in accordance with an embodiment of the present invention, a selective protection controller 330 may be present. As shown in FIG. 4, selective protection controller 330 may be coupled to receive certain incoming data, e.g., an instruction and an indication of the register(s) to be used by the instruction. Furthermore, selective protection controller 330 may be coupled to receive information from a vector 360 which may include a plurality of entries 362a-362n (generically entry 362). In various embodiments, vector 360, which may a bit vector having each entry 362 associated with a corresponding register 322, may store information to indicate whether a given register has been renamed. Whenever an instruction renames an architectural register at rename time the corresponding entry 362 of the previous mapping of bit vector 360 may be set. Bit vector 360 may have as many write ports as instructions that can be renamed in a cycle, and as many read ports as write ports of register file 320.

Selective protection controller 330 may check for two different conditions, in one embodiment: (i) whether a register to be written has already been renamed; and (ii) whether the instruction is at the head of the ROB. Based on this information, selective protection controller 330 may control a coding generator 340 that may include one or more ECC generators and one or more parity generators. As shown in FIG. 4, coding generator 340 is further coupled to receive the write data that is provided to register file 320.

Thus when a physical register is about to be written, it may be determined whether it will need ECC. This check can be done in parallel (e.g., off the critical path) with the execution of the instruction. If selective protection controller 330 determines that ECC is to be performed, the data is sent to ECC generator 345. ECC generation may take several extra cycles (e.g., 2 cycles). As such, if data is written immediately to register file 320, the data would be left unprotected for those cycles. On the other hand, if such writes are delayed until ECC is computed, extra complexity would exist. Thus, all registers may first be protected with parity (which may be performed fast enough to be accommodated within the cycle time of the register write).

Once coding generator 340 finishes, it writes coding and status information to a protection table 350. Protection table 350 includes a plurality of entries 356a-356n (generically entry 356) each corresponding to a given register 322. As shown in FIG. 4, protection table 350 includes a first portion 352 that may be used to store the corresponding protection code and a second portion 354 that may be used to store an indicator, i.e., indicating whether the corresponding code is an error detection code or an error correction code. Note that protection table 350 may be located in various locations, and need not to be next to (or part of) register file 320. In some embodiments, protection table 350 may have its own read/write ports. Protection table 350 may have as many write ports as write ports of register file 350+M (i.e., in a cycle, all register ports may be used for parity plus M ECCs from previous writes). In one embodiment, instead of protection table 350, protection may be achieved by enlarging every register with some amount of additional bits, e.g., 9 bits (8 bits of error detection/correction and one status bit).

Based on control of selective protection controller 330, a given one of ECC generators 345 or parity generators 347 may generate a code to be inserted into protection table 350. Each register is thus protected with the information stored in protection table 350, which can be used either for ECC or parity, e.g., 8-bit ECC, or 8-bit parity (i.e., one bit per byte), and one extra status bit per register may be also used to indicate whether the register is protected by ECC or parity. While shown with these limited components in the embodiment of FIG. 4, it is to be understood that in different embodiments various hardware, software and/or firmware may be used to perform selective register protection in accordance with an embodiment of the present invention. Furthermore, while shown as used for protection of a register file, in other embodiments protection of other portions of a processor such as certain buffers, other storages or other data path elements may be similarly effected.

Figure 5:
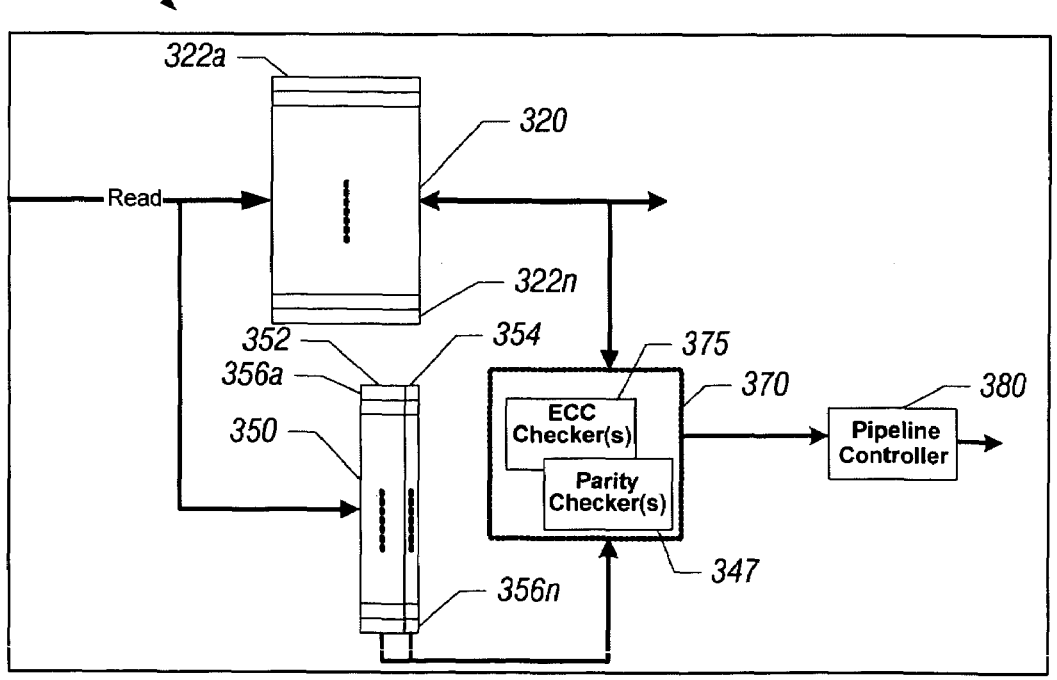
FIG. 5 is a block diagram illustrating additional portions of a processor in accordance with an embodiment of the present invention.

Based on the information stored in protection table 350, various measures may be undertaken to attempt to resolve an error that has been detected. Referring now to FIG. 5, shown is a block diagram illustrating further aspects of a processor in accordance with an embodiment of the present invention. Specifically, FIG. 5 shows additional portions of processor 300, in addition to certain components described above regarding FIG. 4. When data is to be read from register file 320, the read command may also be provided to protection table 350 to access the corresponding entry 356 and provide it to a decoder 370, which may perform the decoding in parallel with the read. Decoder 370 may include one or more ECC checkers 375 and one or more parity checkers 377. The data read from register file 330 will be available right away, while the checking (in decoder 370 through the parity checker or the ECC checker) will be done in parallel, and thus, will not affect the availability of the data. For generating/checking the parity bits, as many parity generators/checkers as write/read ports in register file 350 may be used. As shown in FIG. 5, decoder 370 is further coupled to receive the data read out of register file 320. Based on the data and the corresponding code, a given one of ECC checkers 375 or parity checkers 377 may determine whether the data is correct. If so, no further operations may occur with regard to the error protection provided by embodiments of the present invention. Instead, normal operation and desired use of the result read from the given register 322 of register file 320 may be realized.

If instead an error is detected, various operations may be performed. If possible, the error may be corrected if detected in ECC checker 375. Accordingly, the correct result may be written back to register file 320. Furthermore, the indication of the error detection may also be provided to a pipeline controller 380 which may take various actions depending on whether the error has been corrected or only detected. If the error has been detected, pipeline controller 380 may initiate a pipeline flush and cause re-execution of instructions present in the ROB. If instead the error has been corrected, pipeline controller 380 may instead provide the newly corrected data for re-execution or may cause re-execution of less than all instructions in the ROB. While shown with this particular implementation in the embodiment of FIG. 5, the scope of the present invention is not limited in this regard.

Note that ECC generators and checkers may be expensive resources in terms of area and complexity. One possible way to share them is to reserve like any other functional unit. Another way, which is cheaper, is to drop the ECC generation/checking when all generators/checkers are busy, and rely on parity. In some embodiments, this second option may give good results at a low cost.

For a microarchitecture where speculative values are stored in a ROB rather than a physical register file, values written to the ROB may be protected with parity and only those values that have not been renamed at commit time are protected with ECC.

Thus in various embodiments, techniques to detect and correct soft errors in a register file may increase a processor's resiliency at a low cost in terms of power and area. That is, a selective mechanism may provide for different levels of protection. Higher protection may be used for values that are present in the register file after commitment, while lower protection may be implemented for values that are short-lived in the register file.

Figure 6:
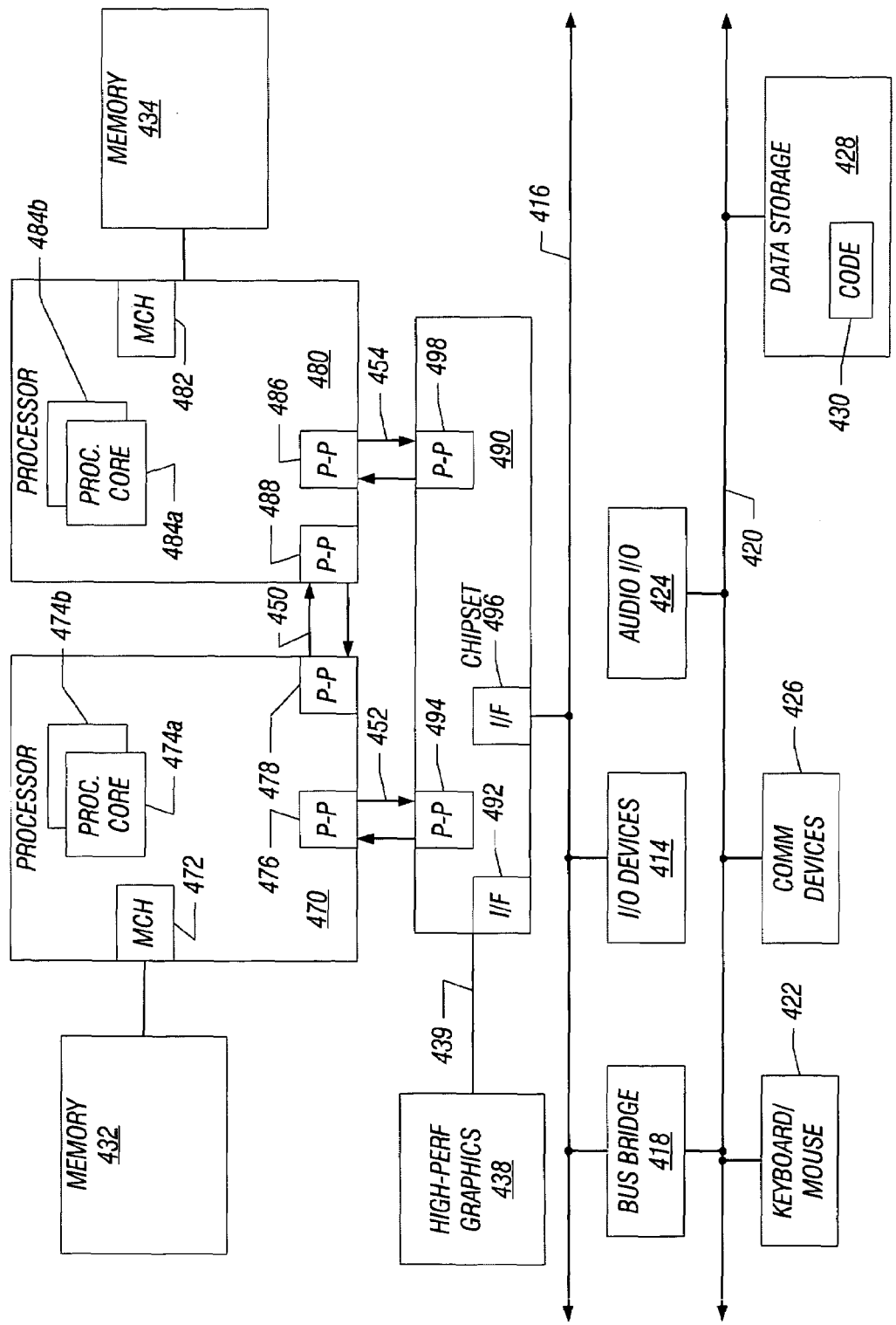
FIG. 6 is a block diagram of a system in accordance with an embodiment of the present invention.

Embodiments may be implemented in many different system types. Referring now to FIG. 6, shown is a block diagram of a multiprocessor system in accordance with an embodiment of the present invention. As shown in FIG. 6, the multiprocessor system is a point-to-point interconnect system, and includes a first processor 470 and a second processor 480 coupled via a point-to-point interconnect 450, although other kinds of interconnects can be used in other embodiments. As shown in FIG. 6, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may perform selective register protection in accordance with an embodiment of the present invention. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 6, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interconnects 452 and 454, respectively. As shown in FIG. 6, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine. 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 6, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 6, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   protecting a value to be stored in a register of a register file with a first level of protection if the value is predicted to be stored in the register for a first time period;
   protecting the value with a second level of protection if the value is predicted to be stored in the register for a second time period, the prediction performed in parallel with storing the value in the register; and
   storing a code for the first level of protection or a code for the second level of protection and an indicator to indicate the first level of protection or the second level of protection in an entry of a protection table corresponding to the register, wherein the code for the first level of protection comprises a parity code and the code for the second level of protection corresponds to an error correction code (ECC).

2. The method of claim 1, wherein the first level of protection corresponds to error detection, wherein the second time period is longer than the first time period.

3. The method of claim 1, further comprising predicting whether the value is to be stored for the first time period or the second time period based at least in part on a location in a re-order buffer (ROB) of a producer instruction that generated the value.

4. The method of claim 3, further comprising predicting whether the value is to be stored for the first time period or the second time period based at least in part on whether the register has been renamed by a later instruction before the value is stored in the register.

5. The method of claim 3, further comprising re-executing the producer instruction if the code is of the first level of protection.

6. The method of claim 1, further comprising first storing a parity code for the value in an entry of the protection table and second overwriting the parity code with an error correction code after the error correction code is generated.

7. An apparatus comprising:
   a register file including a plurality of registers;
   a controller to determine whether a result to be stored in a register of the register file is to be encoded with an error detection code or an error correction code (ECC) based on a length of time for which the result is predicted to be stored in the register; and
   a protection table coupled to the controller to store the error detection code or the error correction code in an entry associated with the register, wherein each entry includes a status indicator to indicate whether the entry includes the error detection code or the error correction code.

8. The apparatus of claim 7, further comprising a code generator coupled to the controller, the code generator to encode the error detection code or the error correction code for the value.

9. The apparatus of claim 8, wherein the code generator comprises at least one ECC generator to encode the error correction code and at least one parity generator to encode the error detection code.

10. The apparatus of claim 7, wherein the controller is to access an entry in a vector associated with the register to determine if the register has been renamed before the result is written to the register.

11. The apparatus of claim 10, wherein the controller is to receive an indication of a location of a producer instruction that generated the value in a reorder buffer (ROB).

12. The apparatus of claim 11, wherein the controller is to determine the coding based on the entry in the vector and the location in the ROB.

13. The apparatus of claim 7, further comprising a code checker to decode the ECC or the error detection code to determine if the value read from the register includes an error.

14. The apparatus of claim 13, further comprising a pipeline controller to flush a pipeline coupled to the register file and re-execute a producer instruction that produced the result if the error is determined and the code comprises an error detection code.

15. A machine-readable medium having stored thereon instructions which if executed by a machine cause the machine to perform a method comprising:
    predicting if a result of a producer instruction to be stored in a location of a reorder buffer (ROB) is to be used after commitment of the producer instruction, the predicting performed in parallel with storing the result in the ROB location;
    coding and storing a first protection code corresponding to an error correction code (ECC) for the result if the result is to be used after the commitment, otherwise coding and storing a second protection code corresponding to an error detection code; and
    storing one of the first or second protection codes and an indicator for the first or second protection code in an entry of a table associated with the ROB location.

16. The machine-readable medium of claim 15, wherein the method further comprises accessing the first protection code from the entry of the table and decoding the first protection code to determine if the result stored in the ROB location includes an error.

17. The machine-readable medium of claim 16, wherein the method further comprises correcting the error to obtain a corrected result using the first protection code and storing the corrected result in the ROB location.

18. The machine readable medium of claim 15, wherein the method further comprises storing the first protection code and the result in the location of the ROB at the commitment.

19. A system comprising:
    a controller to predict a usage lifetime for a data element to be stored in a register of a register file;
    a code generator coupled to the controller to generate an error detection code if the usage lifetime is predicted to be less than a threshold and to generate an error correction code if the usage lifetime is predicted to be greater than the threshold;
    a storage having a plurality of entries each corresponding to a location of the register file, each entry to store the error correction code or the error detection code for the data element in the corresponding location of the register file and a status indicator to indicate whether the entry includes the error detection code or the error correction code; and
    a dynamic random access memory coupled to the controller.

20. The system of claim 19, further comprising a vector to store an indicator when a location of the register file has been renamed.

21. The system of claim 20, wherein the controller is to base the prediction at least in part on presence of the indicator.

22. The system of claim 19, wherein the usage lifetime extends from storage in the register until a last read of the data element from the register.

* * * * *